Figure 1:
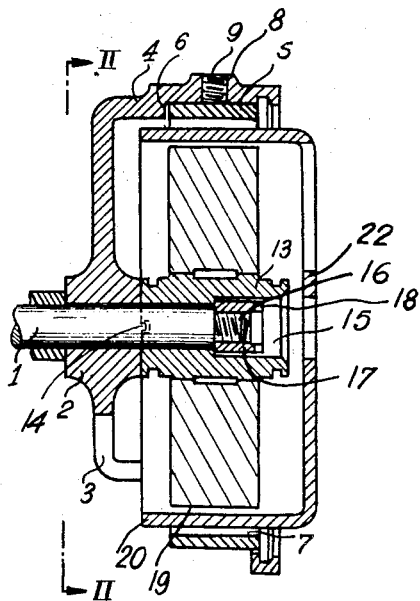

United States Patent Office 2,872,601
Patented Feb. 3, 1959

2,872,601

ADJUSTMENT DEVICES FOR MAGNETIC DRIVE, APPLICABLE NOTABLY TO TACHOMETERS

Pierre Ernest René Fauvelot, Ville-D'Avray, France, assignor to Societe Anonyme Etablissements Ed. Jaeger, Levallois-Perret, France Application July 20, 1955, Serial No. 523,321

Claims priority, application France July 31, 1954

5 Claims. (Cl. 310—105)

As a rule, magnetic drives comprise a permanent magnet which is caused to pivot or rotate in front of a body of non-magnetic material having however a high conductivity; thus, the eddy currents developing in the non-magnetic body impart a driving torque thereto when the magnet is pivoted.

Devices of this general type are applicable mainly to tachometers and the driving torque in the non-magnetic body, the value of which is a function of the velocity of rotation of the permanent magnet, is balanced by resilient return means, so that the angle of shift of the non-magnetic body represents a measurement of the velocity of rotation of the magnet.

According to a known structure of this general type, the permanent magnet has the form of a disc the magnetic poles of which appear on plane faces. Registering with the poles is the body of non-magnetic material which is also of disc shape. In most cases a field-closing member also of disc shape is disposed above the non-magnetic disc. In a structure of this type the adjustment of the torque developed in the non-magnetic disc depends essentially on the position or setting of this non-magnetic disc with respect to the plane pole face of the magnet and also on the position of the field-closing member with respect to both first-mentioned parts, i. e. the magnet and the non-magnetic disc. This adjustment is extremely delicate and highly responsive to temperature variations. Moreover, the axial clearances to be provided for permitting the proper operation of the movable parts interfere with this adjustment. Finally, the measurements are distorted by a substantial and particularly variable leakage flux.

To avoid some of the drawbacks characterizing the structures set forth hereinabove, magnetic drive arrangements have been constructed wherein the magnet consists of a relatively thick disc having apparent magnetic poles on its edge. In this case, the non-magnetic body is of bell-shape and its edge or rim surrounds very closely the magnet edge. A field-closing member may be provided or not at the periphery of the bell-shaped member. This field-closing member is stationary and the torque is adjustable by moving the edge or rim of the bell-shaped member more or less into the magnetic gap. Nevertheless, in these arrangements, many leakage fluxes develop and their variations interfere seriously with the adjustment fidelity. On the other hand the pivot clearances are still considerable and even small variations in these clearances produce substantial errors in the measurements.

The present invention relates to a device for adjusting a magnetic drive of the above-defined type, whereby a permanent or fixed adjustment may be obtained independently of the pivot clearances in both the magnet and the non-magnetic body, and of the influence exerted by thermal variations on the pivot mountings, these variations producing generally changes in the relative axial positions of the magnet, non-magnetic body and field-closing member.

According to this invention, the torque adjustment device is arranged to permit the relative rotation of the magnet and of a field-closing member driven simultaneously with this magnet and having teeth formed on the surface registering with the poles, there being as many teeth as poles on the magnet.

If an arrangement of this type is provided on a magnet wherein the poles appear on a lateral surface, the rim of the corresponding non-magnetic bell-shaped member may be so dimensioned that this rim will project to a substantial extent on either side of the magnet pole faces, thereby permitting of reducing the influence of the variations in the leakage flux while increasing the transmission efficiency.

Of course, the magnet and its field-closing member are driven together with the same movement of rotation.

In some practical embodiments of the invention, the non-magnetic support of the field-closing member and the bottom of the non-magnetic bell-shaped member are connected to their relevant pivot shafts through relatively thin arms whereby the influence of the stray eddy currents may be reduced considerably.

Figure 2:
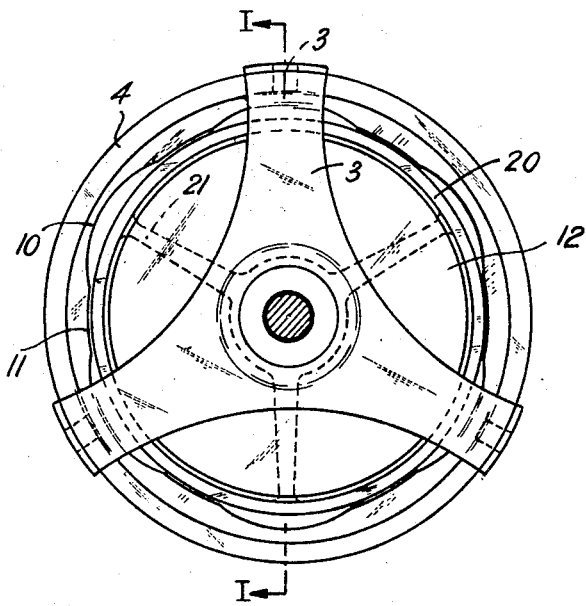

In order to afford a clearer understanding of the present invention and of the manner in which the same may be carried out in practice, a preferred form of embodiment thereof will be described hereafter by way of example with reference to the accompanying drawing. In the drawing:

Figure 1 is an axial section taken upon the line I—I of Fig. 2, showing the magnetic drive of a tachometer, and Figure 2 is an axial view of the drive, when looking in the direction of the arrows II—II of Fig. 1.

On a shaft 1 mounted in suitable bearings (not shown) there is wedged or otherwise secured in engagement with a suitable shoulder or collar a hub 2 of a support carrying a field-closing member. This hub 2 is connected through spaced spider arms 3 to a cylindrical rim 4. A bore 5 is formed in this cylindrical rim 4 and the inner end of this bore 5 forms a shoulder 6 adjacent to the arms 3. A field-closing member 7 is fitted in smooth frictional engagement in the bore 5. In the radial plane of each arm 3 an outer reinforcement or boss 8 is formed on the rim 5 and each reinforcement 8 has a threaded radial hole 9 formed therethrough and adapted to receive a set screw for engaging the outer surface of the field-closing member 7.

The outer surface of the field-closing member is of substantially cylindrical shape but its inner surface has formed therein a plurality of machined eccentric cylindrical recesses or clearances 10 alternating with cylindrical surface elements 11 centred on the axis of shaft 1. In the example illustrated these surfaces 11 are six in number and constitute the heads of the teeth.

The moulded magnet 12 is of substantially disc shape defining a radial magnetic field and its thickness is equal to the axial dimension of the field-closing member. This moulded disc is keyed by moulding on a hub 13 engaging (like the hub 2) the shouldered portion of shaft 1; the hub 13 is angularly rigid with the hub 2 due to the provision of a screw-driver coupling 14. The opposite face of the hub 13 has a shouldered cylindrical bore 15 formed therein which is adapted to receive a cylindrical-sided locking nut 17 engaging the screw-threaded end portion 16 of shaft 1 and having a screw-driver slot or several radial notches 18 formed on its outer face.

In the gap left between the outer or lateral surface 19 of magnet 12 and the inner surface of bore 5 (this last-mentioned surface having six pole faces in the case contemplated) the rim portion 20 of a bell-shaped member of non-magnetic material is inserted, as shown. The axial dimension of this rim portion 20 is considerably greater than that of the magnetic gap, so that it projects to a substantial extent from either end of this gap. The rim portion 20 is connected through relatively thin radial arms 21 to a hub 22 carrying the shaft of the indicator member, for example a pointer or needle, this indicator being pivotally mounted in bearings adapted to centre it very accurately with respect to the shaft 1. The indicator shaft and bearings are not illustrated as they are no part of this invention.

It will be readily understood that the field or torque may be adjusted by simply moving the field-closing member 7 either clockwise or counter-clockwise. Thus, the relative positions of the teeth 11 with respect to the pole faces appearing in the lateral surface 19 of the magnet 12 may be altered at will. When the proper adjustment is achieved the annular field-closing member 7 is locked in position by tightening the set screws in the screw-threaded holes 9.

It will be appreciated that as the adjustment is produced through a relative rotation of parts about a common axis it will remain unaffected by any variations likely to occur in the relative axial positions of the bell-shaped member 20 with respect to the relevant field-closing member. Therefore, these variations may take place either on account of temperature changes acting on the pivotal mounting and bearings concerned or due to the normal mechanical clearances existing in the system. On the other hand, anybody conversant with the art will readily appreciate that the possibility of allowing substantial mechanical clearances in the axial direction will simplify considerably the manufacture of the pivot members. Moreover, the fact that the edges of the bell-shaped member project to a substantial extent in either axial direction outside the magnetic gap will reduce considerably the leakage flux. Besides, by mounting the bell-shaped member and the support carrying the field-closing member on relatively thin radial arms it is possible to avoid the front actions of the magnet which are a common source of stray eddy currents. Finally, any radial dimensional changes likely to be occasioned by temperature variation in the assembly comprising the magnet, the field-closing member and the edge or rim of the bell-shaped member may be counteracted more easily and even compensated by properly selecting the materials of which the magnet, the bell-shaped member, the field-closing member and the support member thereof are made.

Thus, it is desirable to use a light alloy such as Duralumin for making the support carrying the field-closing member, and this member itself may consist of Swedish iron; on the other hand the bell-shaped member may advantageously consist of substantially pure aluminium or any other alloy answering a specific purpose.

It will be readily understood that many modifications may be brought to the embodiment shown and described herein, without departing however from the spirit and scope of the invention.

What I claim is:

1. In a torque adjusting device adapted to an eddy-currents magnetic drive, in combination, a rotatably mounted magnet in the form of a disc and having a multiplicity of poles situated on the cylindrical edge of said disc, a coaxially rotatably movable member forming the seat of eddy-currents, said movable member being provided with a rim portion surrounding said cylindrical edge, an annular field-closing member surrounding said rim portion and internally provided with teeth the number of which is equal to that of said poles, fixing means coupling together said field-closing member and said magnet, and means for adjusting the relative radial positions of said magnet and of said field-closing member.

2. In a torque adjusting device adapted to an eddy-currents magnetic drive, in combination, a rotatably mounted magnet having the form of a disc and presenting a multiplicity of poles situated on the cylindrical edge of said disc, a coaxially rotatably movable member forming the seat of eddy currents, said movable member being provided with a rim portion surrounding said cylindrical edge, an annular field-closing member surrounding said rim portion, said movable member having approximately the same height as said cylindrical edge, said rim portion having a length notably greater than the common height of said movable member and of said cylindrical edge, said rim portion projecting to a substantial extent from either side of the magnetic gap existing between said magnet and said field-closing member, said field-closing member having teeth the number of which is equal to the number of said poles, fixing means coupling together said field-closing member and said magnet, and means for adjusting the relative radial positions of said magnet and of said field-closing member.

3. In a torque adjusting device adapted to an eddy-currents magnetic drive, in combination, a rotatably mounted magnet in the form of a disc and having a multiplicity of poles situated on the cylindrical edge of said disc, a coaxially rotatably movable member forming the seat of eddy-currents, said movable member being provided with a rim portion surrounding said cylindrical edge, said coaxially rotatably movable member being in the form of a bell-shaped member having an edge a rim and a bottom with a central portion connected to said rim by relatively thin radial arms, an annular field-closing member surrounding said rim portion and internally provided with teeth the number of which is equal to that of said poles, fixing means coupling together said field-closing member and said magnet, and means for adjusting the relative radial positions of said magnet and of said field-closing member.

4. In a torque adjusting device adapted to an eddy-currents magnetic drive, in combination, a rotatably mounted radial magnetic field producing means, a coaxially rotatably movable member forming the seat of eddy-currents, a field closing member coupled by relatively thin radially spaced spider arms to said producing means, and means for adjusting the relative radial positions of said field-closing member with respect to said spider arms.

5. In a torque adjusting device adapted to an eddy-currents magnetic drive, in combination, a shaft supporting a rotatably mounted magnet in the form of a disc and having a multiplicity of poles situated on the cylindrical edge of said disc, a coaxially rotatably movable member forming the seat of eddy-currents, said movable member being provided with a rim portion surrounding said cylindrical edge, said coaxially rotatably movable member being in the form of a bell-shaped member having an edge, a rim and a bottom with a central portion connected to said rim by relatively thin radial arms, an annular field-closing member surrounding said rim portion and internally provided with teeth the number of which is equal to that of said poles, relatively thin radially spaced spider arms joining together said shaft and an internally cylindrical rim, and said cylindrical rim being provided with spaced radially threaded holes formed therethrough with set screws therein engaging an external cylindrical surface of said field-closing member thereby to secured said field-closing member in adjusted radial positions relative to said magnet.

References Cited in the file of this patent:

UNITED STATES PATENTS

| | | |
|---|---|---|
| 912,504 | Steckel | Feb. 16, 1909 |
| 2,245,784 | James | June 17, 1941 |
| 2,361,239 | Ransom | Oct. 24, 1944 |
| 2,470,249 | Karasick | May 17, 1949 |
| 2,528,271 | Gibbs | Oct. 31, 1950 |

FOREIGN PATENTS

| | | |
|---|---|---|
| 189,905 | Great Britain | Dec. 14, 1922 |